UNITED STATES PATENT OFFICE 2,584,893

METHOD OF MAKING A TORTILLA FLOUR

William R. Lloyd, Austin, Tex., and Ricardo Millares Sotres, Mexico City, Mexico, assignors to Armour Research Foundation of Illinois Institute of Technology, Chicago, Ill., a corporation of Illinois No Drawing. Application December 6, 1951, Serial No. 260,318

4 Claims. (Cl. 99—93)

This invention relates to a method of making a tortilla flour from the whole grain of corn, or maize.

The present application is a continuation-in-part of our copending application Serial No. 60,395, filed November 16, 1948.

It is an object of the present invention to provide a method, suitable for use on a commercial scale, for the preparation of a tortilla flour which is relatively more stable and which may be formed into a dough having improved taste, texture and elastic properties as compared with the dough made from tortilla flour produced by heretofore known commercial processes.

We have now found that prior commercial processes for the preparation of tortilla flour can be improved by a careful control of the conditions under which the steeping, milling, drying and screening and remilling of coarse particles are carried out. These several steps are hereinafter described in detail.

Steeping

The steeping of the corn is carried out in the presence of water containing a small amount of lime, added either in the form of CaO, or in the form of Ca(OH)$_2$. The lime is added to hot water, preferably while the water is at or near its boiling point, in an amount equal to from 0.90 to 1.25% calculated as CaO by weight of the corn to be prepared. The amount of water used is in large excess of the weight of the corn to be treated, and may suitably be 180% of the weight of the corn. After adding the lime to the hot water and stirring to make a homogeneous suspension, the corn is next added and the steeping carried on for a sufficient length of time for the corn to take up between 35 and 50% by weight of water. During the steeping operation, the water, containing lime as aforesaid, is recirculated through the mass of corn, which may be supported on a perforated false bottom, preferably of conical form.

While the lime-containing water may be at or near its boiling point prior to the addition of the corn, the temperature immediately drops upon the addition of the corn to not over about 90° C. and is held at or below that temperature during the remainder of the steeping operation. Preferably, no more heat is added to the batch during the steeping operation, although, if desired, sufficient heat may be added to maintain the temperature during the steeping operation at or about 90° C. Actual boiling (at 100° C.) is to be avoided since boiling of the corn for any appreciable length of time would result in a breakdown of the structure of the starch granule, with the resultant formation of a paste.

The time of steeping will depend upon the size of the batch prepared and the temperature that is maintained during the steeping operation. For small amounts of corn, say, up to 300 kg. in weight, the steeping time may be about four hours, but for larger batches of corn, the steeping time may be as little as from one to two hours. This is because in the case of small batches, there are higher radiation losses, so that if no heat is added, the temperature drops more rapidly and therefore the average temperature during steeping is lower than in the case of larger batches, where the radiation losses are lower. The actual length of the steeping operation is not critical, so long as the operation is carried out for a sufficient length of time and at a sufficient temperature, not above 90° C., for the corn to pick up an amount of water equal to between 35 and 50% by weight, and preferably between 35 and 45% by weight of water.

The recirculation of water during the steeping operation is carried on in order to have the same temperature and concentration of lime throughout the mass during the entire operation. This is very important in order to assure that each and every one of the corn kernels reaches the same concentration of water and lime by the end of the steeping period. When the steeping time is over, the corn has reached a moisture content of between 35 and 50% (wet basis) and a lime content of between 0.25 to 0.30%, calculated as CaO (dry basis).

At the end of the steeping operation, the steep water is drained off by means of the same recirculating pump and the batch of corn washed with an equal amount of clean cold water. The steep water is then filtered to separate the insoluble solids present in the form of a colloidal suspension, and the clear water, containing part of the dissolved solids of the corn, is sent back to a storage tank to be reused for steeping. This procedure permits some savings in soluble corn solids, thereby increasing the final yield. The insoluble solids are mixed with the dry material coming from the corn cleaners, milled and dried to give a product that is suitable for use as cattle feed.

The drained, steeped corn is then ready to be milled.

Milling

The wet corn, containing 35 to 50% moisture (wet basis) and 0.25 to 0.30% lime (CaO) (dry basis) is ground in an impact mill, preferably a hammermill of the type referred to as a "Mikro" pulverizer mill. During this grinding operation, the product reaches a temperature between 35 and 50° C., due to the heat developed by the action of the hammers hitting the wet corn and making the resulting product go through the screen of the mill. The moisture content of between 35 and 50% water (wet basis), or, preferably, between 35 and 45% water, is maintained during the milling operation.

It is during the milling operation and probably due to the mechanical work performed by the hammers on the wet corn that the protein and starch are developed to impart to the product the required characteristics that will, when the flour is used in the making of tortillas, give cohesion to the dough and elasticity to the final tortilla cake. Cohesion of the dough is the property that permits a small ball of dough to be worked into a thin circular disk, (from $\frac{1}{16}$ to $\frac{3}{16}$ inch thick), by means of pressing it between the hands or any other mechanical device. "Elasticity" of the tortilla is the property that permits the tortilla to be rolled and then unrolled to its original form, without breaking or rupturing the surface.

It is believed that the milling of the corn under the conditions specified above has substantially the same effect upon the product as has the kneading of wheat flour dough in the making of bread, thus developing the proteins present in the corn. As the corn proteins are of lower quality than those of wheat grain, it is understandable that for a similar development in the case of corn, a more drastic treatment is required, and that while in the case of wheat flour dough a kneading operation is sufficient, the more drastic action of a hammermill or a buhrstone mill is required in the making of tortilla flour from corn.

The product from the milling operation is a wet flour containing from about 35 to 50% moisture (wet basis), and preferably from 35 to 45% moisture. This wet flour has already all of the required characteristics to produce a dough with adequate "cohesion", and to produce from the dough tortillas having the desired "elasticity."

The batch, after milling, is next dried.

Drying

The wet flour goes direct from the mill into the drier. Preferably, a "flash drier" type is used that embodies the basic principles of instantaneous drying. The wet flour falls into a drying duct through which passes a current of hot gases or hot air at a temperature between 250° C. and 400° C. The drier is constructed in such a way that the product enters the drying duct as closely as possible to the entrance of the centrifugal fan or blower that produces the air current, and the total length of the drying duct is such as to give a drying time of between 0.3 and 2.0 seconds. Such a drying system permits the drying of the wet flour in a fraction of a second, due to the fact that the finely dispersed product is in intimate contact with the hot gases, which, in turn, are at such a high temperature as to effect instantaneous evaporation of the water on the surfaces of the fine flour particles. The particles themselves do not remain within the stream of hot gases long enough to permit the solid material to reach a temperature above about 55° C., which is low enough to avoid the denaturation of the corn protein and the gelatinization of the starch that is present.

At the end of the drying duct, a cyclone type separator receives and separates the flour from the air stream. The flour comes out of the separator at a moisture content of between 10 and 12% (wet basis), or at least below 14%. The moisture content should not be reduced to as low as 5%, however, since if it were, the flour would lose all the proper characteristics and yield a dough and tortillas with unacceptable characteristics.

Screen and milling of coarse particles

After discharge from the separator, or collector, the dry flour is then classified, preferably by use of a rotary screen. In this screen the fines coming through have a size of 40 mesh or finer and are ready for packaging and marketing, while the coarser particles, having a size larger than 40 mesh, are sent back to a hammermill to be re-ground in the dry state and reduced to a size equal to or smaller than 40 mesh.

This remilling step is important, since it has been found that the particle size has a great influence in the handling characteristics of the dough, and also in the texture and appearance of the final tortilla. The best results are obtained from a flour that has 96 to 100% of the particles of 40 mesh size or finer, but not more than 20% that pass through an 80-mesh sieve.

After remilling, the particles are reincorporated into the stream of fine flour to mix therewith and be packaged.

The final flour thus prepared for marketing may be converted into a dough by the simple addition of about an equal weight of cold water. The dough thus prepared has the properties that are desired with respect to elasticity, stability, and smoothness of texture, and is superior in these respects to dough made from flour produced by heretofore known commercial processes.

The dough so prepared is extremely elastic and may be formed into a conventional tortilla cake or may be used in the manufacture of tamales by the addition of suitable meat sauce and spices. The process herein disclosed may be applied to any type of corn, or maize, produced in any part of Mexico or in any other country, without having to add to the flour so produced such materials as vegetable proteins or other ingredients, which have the property of imparting to the flour the desired characteristics of cohesion, elasticity, and the like and which have heretofore been added to tortilla flour produced by prior methods. In practicing the method of our invention, it is unnecessary to cool or dry the corn before grinding; the drying process to which the flour is subjected after milling does not require the extraction of such large amounts of water as is necessary in the practice of prior methods, as for example, in those procedures involving direct dehydration of ordinary dough; the cost of production by our method is much lower than that in the case of previously used methods because of more efficient operation of the milling and drying processes; and the flour obtained in accordance with our method is the first commercially made product from which tortillas of fully suitable quality and taste have been made available to the public.

From the thorough and complete study of several doughs, we have found that the typical elastic properties that are desirable in the dough, as well as in the resulting tortilla, depend upon adequate hydration and structural development of the corn proteins. We have found it necessary to grind the corn with a moisture content of at least 35%, since if the corn is ground with a water content less than 35%, adequate hydration and development of the protein will not take place and the tortillas thus obtained are brittle and break when rolled. We have also found that the structural development of the corn protein can be most suitably accomplished by the grinding of the corn only if its water content is at least 35% and its temperature is raised to between 35 and 50° C. and only if the grinding is carried out with a slight excess of lime alkalinity, sufficient to maintain a pH of 7 or higher in the corn itself. When the corn is ground under these conditions, changes occur in the arrangement and in the association of the protein molecules, which consequently produce the adequate elastic properties.

It will be understood that modifications and variations may be effected without departing from the scope of the novel concepts of the present invention.

We claim as our invention:

1. The method of preparing a tortilla flour, which comprises steeping whole corn in water containing an amount of lime in excess of that required to neutralize the acidity of the corn and leave a slight excess of lime in the corn, the steeping being carried out at a temperature below 100° C. for a sufficient period of time to bring the water content of the corn to between 35 and 50% by weight (wet basis), grinding the product resulting from this steeping step and while the product still contains between 35 and 50% of water by weight (wet basis), the grinding operation being conducted under such conditions as to cause development of the protein material in the corn, and drying the ground corn product at a temperature such that the product never reaches the gelatinization temperature of the starch content of the corn nor the temperature at which the protein content becomes denatured, the drying being continued until the moisture content of the dried product is less than 14% by weight.

2. The method of preparing a tortilla flour, which comprises steeping whole corn in water at a temperature of about 90° C. but below its boiling point with an amount of lime in excess of that required to neutralize the acidity of the corn and sufficient to leave a slight excess of lime in the corn, continuing the steeping operation for a sufficient length of time to impart to the corn a water content of between 35 and 50% by weight of the corn (wet basis), grinding the product resulting from the steeping step and while the product still contains between 35 and 50% of water by weight of the corn (wet basis), conducting the grinding operation under such conditions as to heat the product during grinding to a temperature of between about 35° C. and 50° C. to cause development of the protein material in the corn, and drying the corn product at a temperature such that the product itself never reaches the gelatinization temperature of the starch content of the corn and never reaches a temperature at which the protein becomes denatured, the drying being carried out until the moisture content of the dried product is less than 14% by weight.

3. The method of preparing a tortilla flour, which comprises steeping whole corn in water containing an amount of lime in excess of that required to neutralize the acidity of the corn and sufficient to leave a slight excess of lime in the corn, the steeping operation being carried out at a temperature not above about 90° C. and for a time sufficient to impart to the corn a water content of between 35 and 50% by weight of the corn (wet basis), grinding the product resulting from the steeping step and while the product still contains between 35 and 50% of water by weight of the corn (wet basis), conducting the grinding operation under such conditions of mechanical impact as to heat the product during grinding to between about 35° C. and 50° C. to cause development of the protein material in the corn, and drying the resulting wet corn flour at a temperature such that the flour dries almost instantaneously but the flour itself never reaches the gelatinization temperature of the starch and never reaches a temperature at which the protein becomes denatured, the drying being carried out in discrete particle form until the moisture content of the dried product is between 10 and 12% by weight.

4. In the method of preparing a tortilla flour, including the steps of steeping whole corn in water at a temperature of below 100° C. and containing an amount of lime in excess of that required to neutralize the acidity of the corn and sufficient to leave a slight excess of lime in the corn until the corn has imparted to it water content of between 35 and 50% by weight of the corn (wet basis), grinding the product while containing a water content within the aforesaid range, and drying the resulting wet corn flour, the improvement which comprises effecting a substantially instantaneous drying of the wet corn flour while suspended in a gaseous stream heated to a temperature between 250 and 400° C. without, however, raising the temperature of the flour itself to a temperature at which gelatinization of the starch occurs or at which the protein becomes denatured, the drying being carried out until the moisture content of the dried flour is less 14% by weight.

WILLIAM R. LLOYD.
RICARDO MILLARES SOTRES.

REFERENCES CITED

The following references are of record in the file of this patent:

UNITED STATES PATENTS

| Number | Name | Date |
|---|---|---|
| 242,588 | Boon | June 7, 1881 |
| 826,983 | Wreford | July 24, 1906 |
| 1,221,636 | Von Hagen | Apr. 3, 1917 |
| 1,262,144 | Villegas | Apr. 9, 1918 |
| 1,268,860 | Lopez | June 11, 1918 |
| 1,334,366 | Garza | Mar. 23, 1920 |
| 1,586,869 | Wesener | June 1, 1926 |

FOREIGN PATENTS

| Number | Country | Date |
|---|---|---|
| 2,032 | Great Britain | of 1862 |
| 402,899 | Great Britain | Dec. 14, 1933 |